United States Patent [19]
Podlesak

[11] Patent Number: 6,052,292
[45] Date of Patent: Apr. 18, 2000

[54] TRIDIRECTIONAL INVERTER

[75] Inventor: Thomas F. Podlesak, Manassas, Va.

[73] Assignee: The United States of America as represented by the Secretary of the Army, Washington, D.C.

[21] Appl. No.: 09/393,064

[22] Filed: Aug. 30, 1999

[51] Int. Cl.[7] .................................................. H02J 3/00
[52] U.S. Cl. .......................... 363/34; 363/37; 363/125; 363/131
[58] Field of Search ................................ 363/34, 37, 125, 363/131

[56] References Cited

U.S. PATENT DOCUMENTS

| | | | |
|---|---|---|---|
| 4,719,550 | 1/1988 | Powell et al. | 363/37 |
| 5,939,798 | 8/1999 | Miller | 307/64 |
| 5,978,236 | 11/1999 | Faberman et al. | 363/37 |
| 5,982,645 | 11/1999 | Levran et al. | 363/37 |

*Primary Examiner*—Edward H. Tso
*Assistant Examiner*—Gary L. Laxton
*Attorney, Agent, or Firm*—Paul S. Clohan, Jr.

[57] ABSTRACT

A tridirectional inverter is disclosed which converts power from the single source into two different widely types of power outputs. This conversion is done by utilizing a magnetic element, i.e., a transformer, alternatively as a filter and as a voltage changing transformer. The function that the magnetic element provides is accomplished by selecting the frequency of the signal that is applied to the magnetic element.

8 Claims, 1 Drawing Sheet

TRIDIRECTIONAL INVERTER

ORIGIN OF THE INVENTION

The invention described herein was made in the performance of official duties by an employee of the Department of the Army and may be manufactured, used, licensed by or for the Government for any governmental purpose without the payment of any royalty thereon.

BACKGROUND OF THE INVENTION

1.0 Field of the Invention

The present invention relates to power conversion and, more particularly, to a converter which converts electrical power from a single source to two different type outputs.

2.0 Description of the Prior Art

An inverter, sometime referred to as a converter, converts one type of an electrical power to another. One of the more common types converts alternating current (AC) of one frequency to another frequency. Voltage can also be converted across such a device. The inverter accomplishes this by rectifying AC into direct current (DC) and then utilizes an inverse rectifier (inverter) to convert the DC back to AC, most likely an AC with a different frequency and voltage from the original input. Although inverters serve well, their intended purpose, there is a need to convert power from a single source into two widely different output. For example, there is a need to convert power from a single source into two different types of outputs, one being a high power output and the other being a low power output.

SUMMARY OF THE INVENTION

Accordingly, it is a primary object of the present invention to provide for an inverter that converts power from a single source into two widely different types of outputs, with one output being of a high power type and the other output being of a low power type.

It is another object of the present invention to provide for an inverter having means that serve as an energy stored element which may be discharged into a user requiring stored energy.

It is yet another object of the present invention to provide for an inverter that utilizes a transformer including primary and secondary windings, wherein the primary winding is stationary and the secondary winding is rotatable.

In accordance with these and other objects, the invention provides an inverter comprising first, second, and third rectifiers, and a transformer-inductor (T1-L1) element. The inverter has an input stage and first and second outputs and is responsive to signals generated by an external gating circuit. The input stage is capable of receiving excitation having a fixed variable or selectable frequency and the inverter provides different levels of power separately to each of the first and second outputs depending upon the frequency of the received excitation. The first rectifier has an input and an output and is arranged in a first configuration and is responsive to the signals of the external gating circuit. The input of the first rectifier has first and second ends and is arranged to receive the variable frequency excitation with the output of the first rectifier having first and second ends and providing first DC output. The transformer-inductor (T1-L1) element has a primary winding, a secondary winding, and a magnetic core having a selectable amount of iron. The primary and secondary windings each has first and second ends and with the first end of the primary winding connected to the first end of the output of the first rectifier. The second rectifier has an input and output and has switches arranged in a second configuration identical to the first configuration so as provide a symmetrical operation between a first and second rectifiers. The switches of the second rectifier are responsive to the signals of the external gating circuit. The input of the second rectifier has first and second ends and has its first end connected to the second end of the primary winding. The output of the second rectifier has first and second ends and is arranged to provide a first AC output. The third rectifier has an input and an output and has switches arranged in a third configuration identical to the first and second configurations so as to provide symmetrical operation between the first, second and third rectifiers. The switches of the third rectifier are responsive to the signals of the external gating circuit. The input and output of the third rectifier each has first and second ends and the output of the third rectifier is arranged to be connected across the first and second ends of the secondary winding and the output of the third rectifier is arranged to provide a second AC output.

BRIEF DESCRIPTION OF THE DRAWINGS

The foregoing objects and advantages of the present invention will be more fully understood from the following detailed description having reference to the appended drawings wherein.

DETAILED DESCRIPTION OF THE PREFERRED EMBODIMENTS

Figure 1:
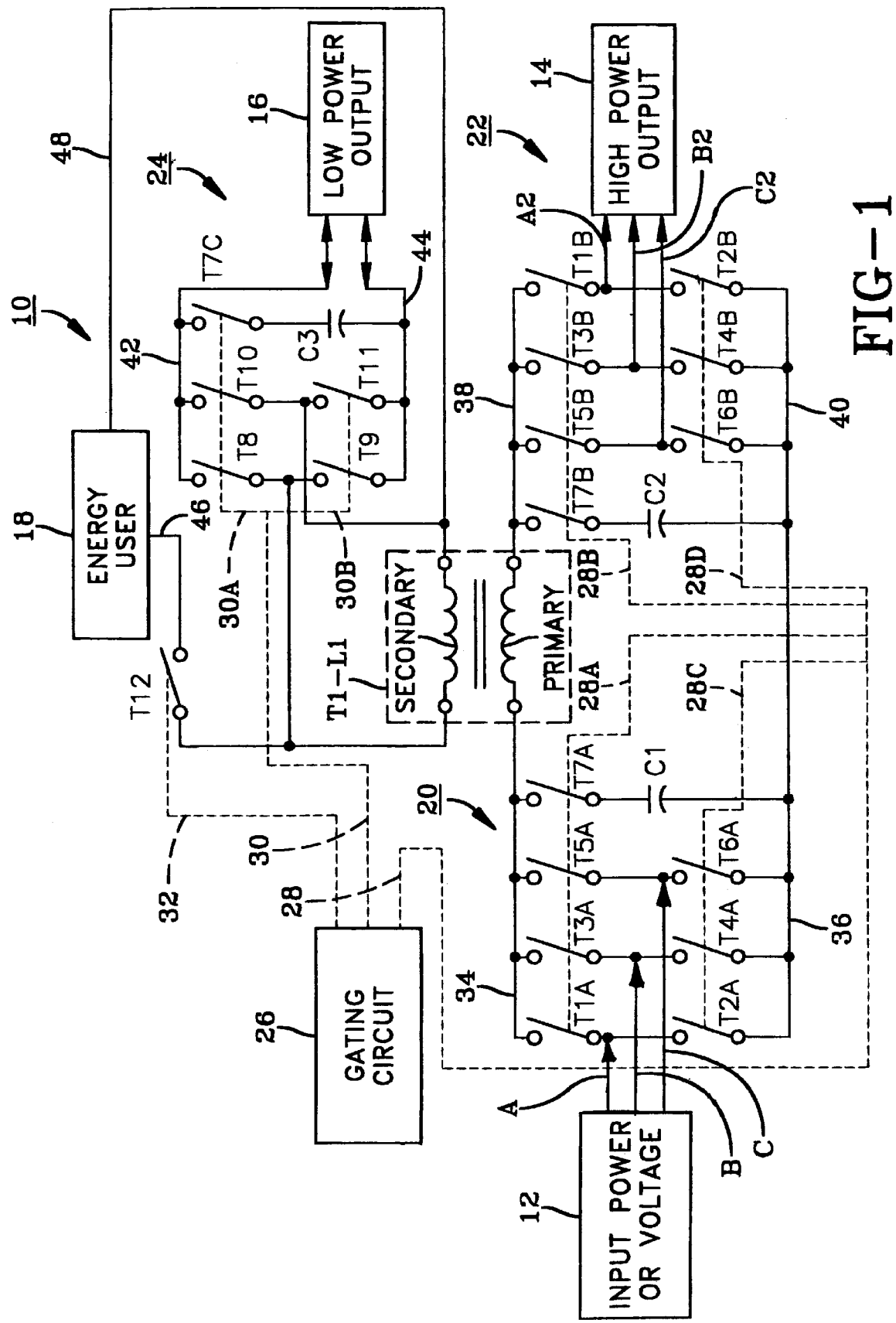
FIG. 1 is the sole drawing of the invention and illustrates the inverter of the present invention.

There is shown in FIG. 1, the inverter of the present invention generally designated by the reference number 10. The inverter 10 has an input stage and first and second outputs with the input stage receiving excitation generated by a source 12 that provides power at a fixed, variable or selectable frequency. The source 12 typically provides three (3) phase excitation identified as A, B, C respectively. The inverter 10 provides at least two levels of power separately to first and second outputs identified as 14 and 16, respectively, indicated as a high power output 14 and a low power output 16. The inverter 10 also provides for an energy stored element that is utilized by energy user 18.

In general, the inverter is a tridirectional inverter that converts power from a single source 12 into two widely different types of outputs with one output being a high power output 14 and with the second output being a low power output 16. The inverter 10 utilizes a magnetic element identified in FIG. 1 as the transformer-inductor (T1-L1) element alternatively to provide a first function, which is a filter inductor, and a second function, which is a voltage-changing transformer. The selection of the first and second functions is accomplished by varying the type and frequency of the signal provided by source 12.

The inverter 10 comprises first, second, and third rectifiers respectively identified by reference numbers 20, 22, and 24, each of which contains electronic switches comprising transistor other known switching devices and each of which is responsive to signals generated by an external gating circuit 26. The first rectifier 20 comprises switches T1A, T2A, T3A, T4A, T5A, T6A, and T7A. The second rectifier comprises switches T1B, T2B, T3B, T4B, T5B, T6B, and T7B. The third rectifier 24 comprises switches T8, T9, T10, T11, and T7C.

The gating circuit 26 has signal buses 28 and 30 and a control signal path 32 that operates a switch T12 which is used in conjunction with the energy user 18. The control bus 28 is divided in to paths 28A, 28B, 28C and 28D. The path 28A is routed to switches T1A, T3A, T5A, and T7A, whereas paths 28B are routed to switches T1B, T3B, T5B, and T7B. Similarly, path 28C is routed to switches T2A, T4A, and T6A, whereas path 28D is routed to switches T2B, T4B, and T6B. The bus 30 is divided into paths 30A and 30B which are respectively routed to switches T8, T7C and T10 and T9 and T11. Each of the switches of the first, second and third rectifiers 20, 22, 24 are rendered conductive during a selected period of either the applied excitation generated by source 12 or the voltage present across the secondary winding of the T1-L1 element. The correlation between the switches and the conductive portions of the applied excitation or the voltage across the secondary of the T1-L1 element is given in Table 1.

TABLE 1

| Switches of Rectifiers 20, 22 and 24 | Rendered Conductive by Gating Circuit26 |
| --- | --- |
| T1A | During Positive Half Cycle of Phase A |
| T2A | During Negative Half Cycle of Phase A |
| T3A | During Positive Half Cycle of Phase B |
| T4A | During Negative Half Cycle of Phase B |
| T5A | During Positive Half Cycle of Phase C |
| T6A | During Negative Half Cycle of Phase C |
| T7A, T7B and T7C | During all cycles of Phases A, B, and C |
| T8 and T11 | During Positive Half Cycle of Voltage Across Secondary of 71-L1 |
| T9 and T10 | During Negative Half Cycle of Voltage Across Secondary of T1-L1 |

The first rectifier 20 has its switches arranged in a first configuration so as to be responsive to the gating signals of the gating circuit 26 in a predetermined manner. The input, as well as the output of the first rectifier 20, has first and second ends 34 and 36 and provides a first DC output across the first and second ends 34 and 36. Preferably the inverter 10 includes a first serial arrangement comprising the switch T7A and a filter capacitor C1 which is connected across the first and second ends 34 and 36 of the first rectifier 20. The switch T7A allows the capacitor C1 to be switched in and out of the circuit, resulting in an AC output when the switch T7A is open and a DC output when the switch T7A is closed. Switches T7B and T7C operate in a manner similar to T7A to respectively control capacitors C2 and C3.

The transformer inductor (T1-L1) element has a primary winding, a secondary winding, and a magnetic core having a selectable amount of magnetic material, such as iron or iron alloy to be further described. The primary and secondary windings, shown in FIG. 1, have first and second ends with the first end of the primary winding connected to the first end 34 of the output of the first rectifier 20.

The second rectifier 22 has an input and an output as well as the switches arranged in a second configuration which is identical to the first configuration so as to provide for a symmetrical operation between the first and second rectifiers 20 and 22. The input, as well as the output of the second rectifier 22, has first and second ends 38 and 40 with the second end 38 connected to the second end of the primary winding. The output of the second rectifier 20 is arranged to provide a first AC output identified in FIG. 1 by phases A2, B2, and C2. The second rectifier 22 preferably further comprises a second serial arrangement of a second switch T7B and a second filter capacitor C2. The second arrangement is connected across the first and second ends 38 and 40 of the second rectifier 22.

The third rectifier 24 has an input and output and has the switches arranged in a third configuration which is identical to the first and second configurations of the first and second rectifiers 20 and 22, respectively, so as to provide a symmetrical operation between the first, second, and third rectifiers. The input and the output of the third rectifier 24 has first and second ends 42 and 44. The second end of the secondary winding is connected to the second end 44 of the third rectifier 24, whereas the first end of the secondary winding is connected to one end of each of the switches T8 and T9, as shown in FIG. 1. Preferably, the rectifier 24 has a third filter capacitor C3 connected across its first and second ends 42 and 44. The switches T8 to T11 comprise a first bank and the switch T7C comprises a first control switch each having opened and closed states and wherein when the first control switch T7C is in its open state the third rectifier 24 operates as an inverter to provide a second AC output and, conversely, when the first control switch T7C is in its closed state the third rectifier 24 operates as a rectifier to provide a DC output.

In one embodiment the secondary winding is provided with means so as to be rotatable, while the primary winding remains stationary. In another embodiment the transistor device T12 has first and second ends with the first end thereof connected to the first end of the secondary winding and with the second end connected to the energy user 18 by way of signal path 46. The energy user 18 is connected to the second end of the secondary winding by way of return path 48.

Operation of the Inverter 10

The input power of source 12 is applied for the first rectifier 20 as three (3) phase AC signals and is converted in to DC by the operation of the first rectifier 20. The DC output of the first rectifier 20 is filtered by the filter capacitors C1, C2, as well as the T1-L1 element, and is inverted back to AC signal by the operation of the second rectifier 22. The AC output of the second rectifier 22 then passes as a multi-phase output (A2, B2 and C2) appearing as high power output 14.

The operation of the first and second rectifiers 20 and 22 are identical and the filters C1 and C2 are symmetrical. Hence, the operation of the rectifiers 20 and 22 is symmetrical. This symmetrical operation means that power can flow from the high power output 14 to the input of the first rectifier 20 as well as from the input of the first rectifier 20 to the high power output 14. This type of a converter is commonly termed bidirectional.

An essential feature of the present invention is to provide for the transformer-inductor having a secondary winding. The secondary winding makes what was once a filter inductor (T1-L1 without a secondary winding) a transformer, allowing power to pass from the input of the first rectifier 20 through the T1-L1 to the third rectifier 24 and through the filter C3 to appear as the low power output 16. Because of the configuration of the switches of the rectifiers 20, 22, and 24 are selected to be identical so as to provide for symmetrical operation of the rectifiers 20, 22, and 24, the power may also pass from the low power output 16 to the input of the first rectifier 20, or from the low power output 16 to the high power 14. These three possible paths are the basis for terming the tridirectional inverter of the present invention.

The overall flow of the power through the transformer-inductor (T1-L1) is governed by the action of the various rectifiers 20, 22, and 24. Using the first rectifier 20 as an example, operating rectifier 20 at standard frequencies, e.g. 10–100 Hz AC makes the T1-L1 element operate as a filter inductor and passes the power from the first rectifier, straight through the second rectifier 22 and appearing as the high power output 14. Inversely, operating the first rectifier 20 as a high frequency inverter which produces an output at high frequency AC voltage (e.g. 10 kHz and higher frequencies) allows the T1-L1 element to function as a high frequency transformer which, in turn, diverts the current to flow from the first rectifier 20 through the third rectifier 24.

The transformed (T1-L1) element is constructed only to function as a transformer for high frequency utilization in a manner known in the art. The ability of a transformer to transform voltage and current is heavily dependent upon a magnetic material, e.g. iron, or iron alloy present in the magnetic core thereof. Insufficient magnetic material in a transformer core will severely restrict the ability of the transformer to transmit power. The ability to transfer power increases with increased frequency. Therefore, a transformer subject to a low frequency input will not function effectively as a transformer in a manner known in the art, if undersized for operation at such frequency, and operates merely as an inductor at the residual inductance available at this frequency. This operation at residual frequency should be satisfactory for the task of the filter inductor in a three phase rectifier circuit. Yet it may be most efficient of the transformer at a high frequency.

In accordance with the practice of the present invention, the magnetic component of the T1-L1 element is selected to either establish an operation of a transformer or operation of an inductor by selecting the frequency of the input. The filter capacitor C1 and C2 are also deterministic of the operation of the T1-L1 element as a transformer or as a filter circuit. When the T1-L1 element operates as an inductor, the switches T7A for C1, and T7B for C2 are rendered conductive by the control circuit 26 so as to arrange or not arrange the capacitors into a filter circuit. When the T1-L1 element operates as a transformer, the switches T7A and T7B are rendered non-conducted so that they are open, removing an unwanted bypass circuit path from the high frequency power.

In one embodiment, the secondary of the T1-L1 element may also be operated as an inductor, more particularly, as an energy storage element. Energy may be stored in the magnetic material of the T1-L1 element and then discharged to the energy user 18 by way of signal path 46 by rendering conductive switch T12 in responses to a signal on a control path 32 generated by the gating circuit 26. Charging of the magnetic material will occur by the operation of the T1-L1 element as an inductor. The element T1-L1 will be charged by way of its primary winding, and discharged by way of its secondary winding, or visa versa. The energy stored is maintained by the presence of the magnetization current. This magnetization current flows through the inductor for normal inverter operation and is adequate for this purpose. The discharge is accomplished by interrupting this magnetization current which can be done by opening the various switches of the rectifiers 20, 22, and 24. The resulting discharged energy produces a large, though short-lived current. The bypass switch T12 should be sized to accommodate this discharge and eliminate the need for the third rectifier 24 to be stressed by this large current. The operation of the T1-L1 element may be quickly altered from transformer to inductor so as to multiplex the outputs, allowing simultaneous operation in both modes, where one mode is being a transformer and the other mode is being an inductor.

In should now be appreciated that the practice of the present invention provides for a tridirectional inverter that inverts power from the source into widely different types of outputs, with one output being a high power output and the other output being a low power output.

The tridirectional inverter of the present invention provides many applications that utilizes the provisions of providing two widely different types of power. The transformer, that is, the T1-L1 element, may be split into two halves, one for the primary winding, and the other for the secondary winding. The halves may be maneuvered independently mechanical. In a military vehicle, such as a tank, the secondary winding could be mounted in the turret and allowed to rotate, whereas the primary winding remains stationary in the hull of the tank.

The inverter 10 of the present invention could provide low voltage power for electrical propulsion motors in the hull of the tank and high voltage power for the electrical gun in the turret. The electrical gun system could store energy in a magnetic material of both the hull and the turret, yet use it in the turret alone.

In the commercial section, the inverter of the present invention may be used as indicated in construction machinery, where large power consuming structures are required to rotate a full 360°, as well as any application where widely different power types are required.

Although the invention has been described relative to specific embodiments thereof, there are numerous variations and modifications that will be readily apparent to those skilled in the art in light of the above teaching. It is, therefore, understood that within the scope of the appending claims, the invention may be practiced other than as specifically described.

What I claim is:

1. An inverter having an input stage and first and second outputs and being responsive to signals generated by an external gating circuit, said input stage receiving excitation having a fixed, variable or selectable frequency and said inverter providing different levels of power separately to each of said first and second outputs dependent upon the frequency of said received excitation, said inverter comprising:

a first rectifier having an input and an output and having switches arranged in a first configuration and being responsive to said signals of said external gating circuit, said input of said first rectifier having first and second ends and arranged to receive said variable frequency excitation and said output of said first rectifier having first and second ends and providing a first DC output;

a transformer-inductor (T1-L1) element having a primary winding and a secondary winding and a magnetic core having a selectable amount of magnetic material, said primary and secondary windings having first and second ends and with the first end of said primary winding connected to said first end of said output of said first rectifier;

a second rectifier having an input and an output and having switches arranged in a second configuration so as to provide a symmetrical operation between said first and second rectifiers, said switches of said second rectifier being responsive to said signals of said external gating circuit, said input of said second rectifier having first and second ends and having its first end connected to said second end of said primary winding, said output of said second rectifier having first and second ends and arranged to provide a first AC output; and a third rectifier having an input and an output and having switches arranged in a configuration identical to said first and second configurations so as to provide symmetrical operation between said first, second and third rectifiers, said switches of said third rectifier being responsive to said signals of said external gating circuit, said input and said output of said third rectifier each having first and second ends and said input of said third rectifier arranged to be connected across said first and second ends of said secondary winding.

2. The inverter according to claim 1, wherein said switches of said third rectifier comprise a first bank and a first control switch each having opened and closed states and wherein when said first control switch is in its open state said third rectifier operates as an inverter to provide a second AC output and, conversely, when said first control switch is in its closed state said third rectifier operates as a rectifier to provide a DC output.

3. The inverter according to claim 1 wherein said magnetic material is selected from the group consisting of iron and iron alloy.

4. The inverter according to claim 1, further comprising a first serial arrangement of a first switch and a first filter capacitor with the first switch being responsive to said signals of said external gating circuit, said first serial arrangement connected across said first and second ends of said output of said first rectifier.

5. The inverter according to claim 1, further comprising a second serial arrangement of a second switch and a second filter capacitor with the second switch being responsive to said signals of said external gating circuit, said second serial arrangement connected between said first and second ends of input of said second rectifier.

6. The inverter according to claim 1, further comprising a third serial arrangement including a first control switch, and a third filter capacitor with the first control switch being responsive to said signals of said external gating circuit, said third serial arrangement being connected across said first and second ends of said output of said third rectifier.

7. The inverter according to claim 1, further comprising a fourth switch having first and second ends with the first end thereof being connected to said first end of said secondary winding, said fourth switch being responsive to said signals of said external gating circuit.

8. The inverter according to claim 1, wherein said primary and secondary windings are respectively arranged to be stationary and rotatable.

* * * * *